United States Patent
Speight et al.

(10) Patent No.: US 7,958,317 B2
(45) Date of Patent: Jun. 7, 2011

(54) CACHE DIRECTED SEQUENTIAL PREFETCH

(75) Inventors: William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/185,219

(22) Filed: Aug. 4, 2008

(65) Prior Publication Data
US 2010/0030973 A1 Feb. 4, 2010

(51) Int. Cl.
*G06F 12/00* (2006.01)
(52) U.S. Cl. ........ 711/137; 711/119; 711/130; 711/141; 711/144; 711/145
(58) Field of Classification Search .................. 711/119, 711/130, 137, 141, 144, 145
See application file for complete search history.

(56) References Cited

U.S. PATENT DOCUMENTS

| | | | |
|---|---|---|---|
| 6,535,962 B1 | 3/2003 | Mayfield et al. | |
| 7,350,029 B2 | 3/2008 | Fluhr et al. | |
| 7,380,066 B2 | 5/2008 | Griswell, Jr. et al. | |
| 2009/0070556 A1* | 3/2009 | Griswell et al. | 712/207 |
| 2009/0198950 A1* | 8/2009 | Arimilli et al. | 711/205 |

\* cited by examiner

*Primary Examiner* — Jack A Lane
(74) *Attorney, Agent, or Firm* — Mitch Harris, Atty at Law, LLC; Andrew M. Harris; Libby Z. Toub

(57) ABSTRACT

A technique for performing stream detection and prefetching within a cache memory simplifies stream detection and prefetching. A bit in a cache directory or cache entry indicates that a cache line has not been accessed since being prefetched and another bit indicates the direction of a stream associated with the cache line. A next cache line is prefetched when a previously prefetched cache line is accessed, so that the cache always attempts to prefetch one cache line ahead of accesses, in the direction of a detected stream. Stream detection is performed in response to load misses tracked in the load miss queue (LMQ). The LMQ stores an offset indicating a first miss at the offset within a cache line. A next miss to the line sets a direction bit based on the difference between the first and second offsets and causes prefetch of the next line for the stream.

12 Claims, 4 Drawing Sheets

| LMQ | 36 | | | | | |
|---|---|---|---|---|---|---|
| Line address | Offset 1 | Offset 2 | other flags | P | D | |
| | | | | | | |
| | | | | | | 40 |
| | | | | | | |
| | | | | | | |
| | | | | | | |
| | | | | | | |

Fig. 3A

Directory 37

| Line address | index/tag | other flags | P | D |
|---|---|---|---|---|
| | | | | |
| | | | | |
| | | | | | 42
| | | | | |
| | | | | |

Fig. 3B

Value Storage 38

| tag | flags | P | D | Contents |
|---|---|---|---|---|
| | | | | |
| | | | | | 44
| | | | | |
| | | | | |
| | | | | |

Fig. 3C

CACHE DIRECTED SEQUENTIAL PREFETCH

BACKGROUND OF THE INVENTION

1. Field of the Invention

The present invention is related to processing systems and processors, and more specifically to techniques for supporting stream prefetching directed by cache control logic.

2. Description of Related Art

Stream prefetching provides an efficient use of resources in processors and processing systems. When sequential access to two or more adjacent locations is detected, one or more additional cache lines can be prefetched from lower levels of a memory hierarchy in order to attempt to have data and/or instructions ready for use by the processor as they are needed. A "stream" is a contiguous set of cache lines containing instructions or data (or in some specialized processor architectures, instructions and data). The sequential fetching described above, is referred to a stream prefetching or stream prefetch.

Some existing stream prefetch schemes include a load-miss queue (LMQ) that tracks "load misses", which are attempts to access a line that is not present in the particular level of cache memory associated with the LMQ. The LMQ values are filtered to detect adjacent cache lines and if any adjacent misses are detected, a stream table/stream queue is populated with an entry corresponding to the adjacent misses. The prefetch engine then prefetches at least one cache line ahead of the most recent cache line miss, in the apparent direction of the stream progress through the cache.

While such architectures are capable of detecting streams and directing prefetching of the streams, there are some inefficiencies involved, in particular with respect to out-of-order superscalar processors or symmetrical multi-threaded (SMT) processors, in which multiple load-store units (LSUs) may be present. The multiple LSUs compete with the prefetch engine for access to the LMQ, as LMQ entries must be updated on each cache miss and the prefetch engine needs the LMQ to maintain information about what lines are being prefetched. In SMT processors with multiple LSUs, the LSUs must compete with the prefetch engine, further decreasing efficiency. The LSUs typically insert a reject cycle for each missed fetch attempt until the LMQ is available, and insert a reject cycle for each prefetch request made by the prefetch engine. Further, the intermediate tables for stream filtering and the stream table itself require resources that consume power and occupy die area.

Therefore, it would be desirable to provide a stream detection and prefetch mechanism that does not require a stream table and other resources, and that removes conflicts between LSUs and the prefetch engine.

BRIEF SUMMARY OF THE INVENTION

The invention is embodied in a processor, system, and cache memory that detect and prefetch data and/or instruction streams in response to the detection of cache misses. The method is a method of operation of the cache memory control and the processor contains a cache memory operating according to the method.

The cache controls stream prefetching by requesting cache loads one line ahead of the cache lines accessed/requested for the streams. A corresponding first "prefetched" bit for each cache line is stored in a location within the cache and indicates that the cache line has been prefetched but not yet accessed. Upon access to a cache line, the first bit is checked and if the first bit is set, a next cache line for the stream is requested for loading from a lower level of the memory hierarchy and the first bit is cleared. The cache line requested for prefetching is determined from a second "direction" bit stored along with the first bit. The first and second bits can be stored in cache line directory entries in the cache, or in additional storage within the cache line value storage locations. A load miss queue entry is allocated for the requested cache line, with a prefetched bit set and a direction bit set according to the stream direction.

Cache misses are tracked in the load miss queue of the cache, and stream detection is performed by tracking multiple misses in a load miss queue entry. A first miss to a cache line sets a first offset and a second miss to the cache line indicates a detected stream. The direction of the stream is determined from the difference between the offset of first miss and the second miss within the cache line. When a stream is detected, a prefetch request is made to load an adjacent cache line according to the direction bit.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIGS. 3A-3C are block diagrams depicting data structure within load miss queue 36, and cache directory 37 or cache value storage 38 of FIG. 2, respectively.

DETAILED DESCRIPTION OF THE INVENTION

The present invention relates to cache memory and processors including a cache memory that triggers automatic prefetching of values from a lower level in a memory hierarchy for detected streams. Stream detection is performed in the cache memory itself and accesses to prefetched cache lines are tracked to prefetch a next cache line when a prefetched (or previously requested) cache line is accessed. In response to a first load miss to a cache line, an offset is set in a corresponding load miss queue (LMQ) entry that indicates that a load miss has occurred at that offset. A subsequent miss to the cache line sets a direction bit in the load miss queue entry in conformity with the difference between the offsets of the first and second load miss, indicating a direction of the detected stream. The second offset is stored in the LMQ entry. Another cache line is requested adjacent to the cache line according to the direction, so that the cache automatically prefetches a cache line ahead of (or behind) accesses by the stream. An LMQ entry is allocated for the new prefetch with the prefetched bit set to "1" and the direction bit pre-set according to the direction of the detected stream. When a prefetched cache line is loaded into the cache, the LMQ entry is retired, the prefetched bit and direction bit are copied from the LMQ entry to the directory entry or cache line value storage for the prefetched cache line. In response to a load hit, the cache control checks the "prefetched" bit in the directory or cache line. If the prefetched bit is set, it is cleared and an adjacent cache line is prefetched according to the direction bit in the directory or cache line. A new load miss queue entry is generated for each newly prefetched cache line (whether due to a hit or a miss to the previous cache line), with the prefetched bit and direction bit pre-set. A subsequent miss to the prefetched cache line before the prefetched cache line is loaded into the cache will reset the prefetched bit of the load miss queue entry and start a prefetch of the next cache line in the stream.

Figure 1:
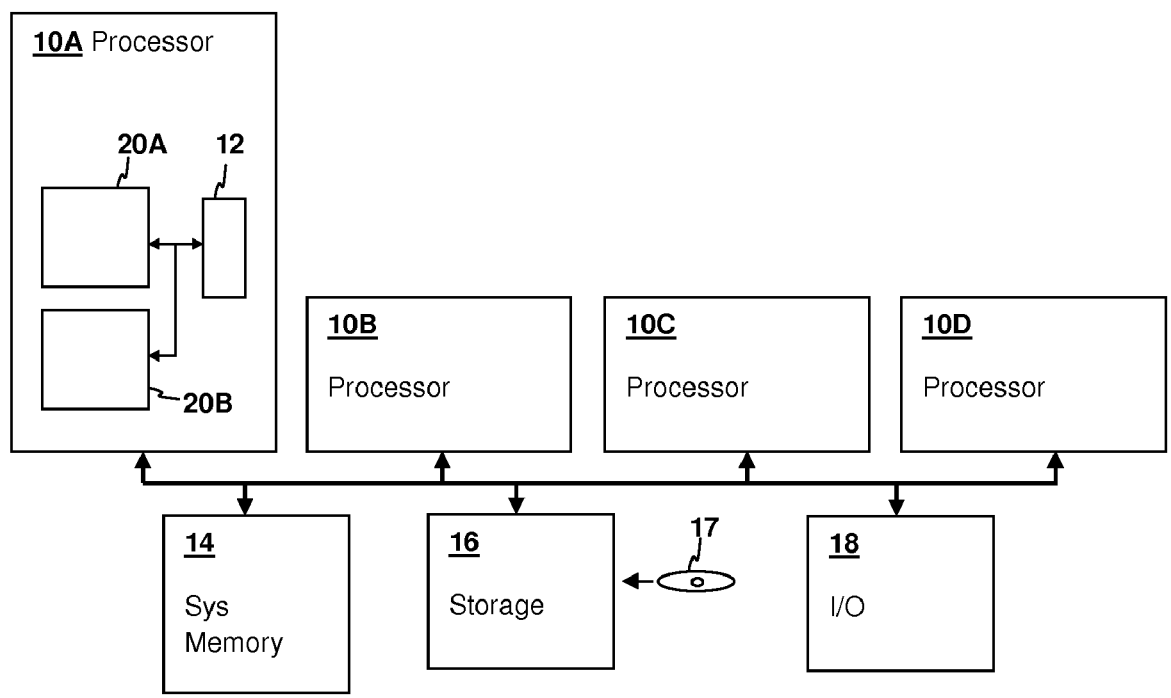
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and processing systems in accordance with other embodiments of the present invention include uni-processor systems. Processors 10A-10D are identical in structure and include cores 20A-20B and local storage 12, which may be a cache level, or a level of internal system memory. Processors 10A-10B are coupled to main system memory 14, a storage subsystem 16, which includes non-removable drives and optical drives, for reading media such as a CD-ROM 17 for loading program code for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system in which the cache-directed prefetching methodology the present invention is implemented, it is understood that techniques of the present invention can be implemented in other architectures and that the present invention applies to general-purpose processor devices and cache memory devices in accordance with embodiments of the present invention that may be used in a variety of system architectures.

Figure 2:
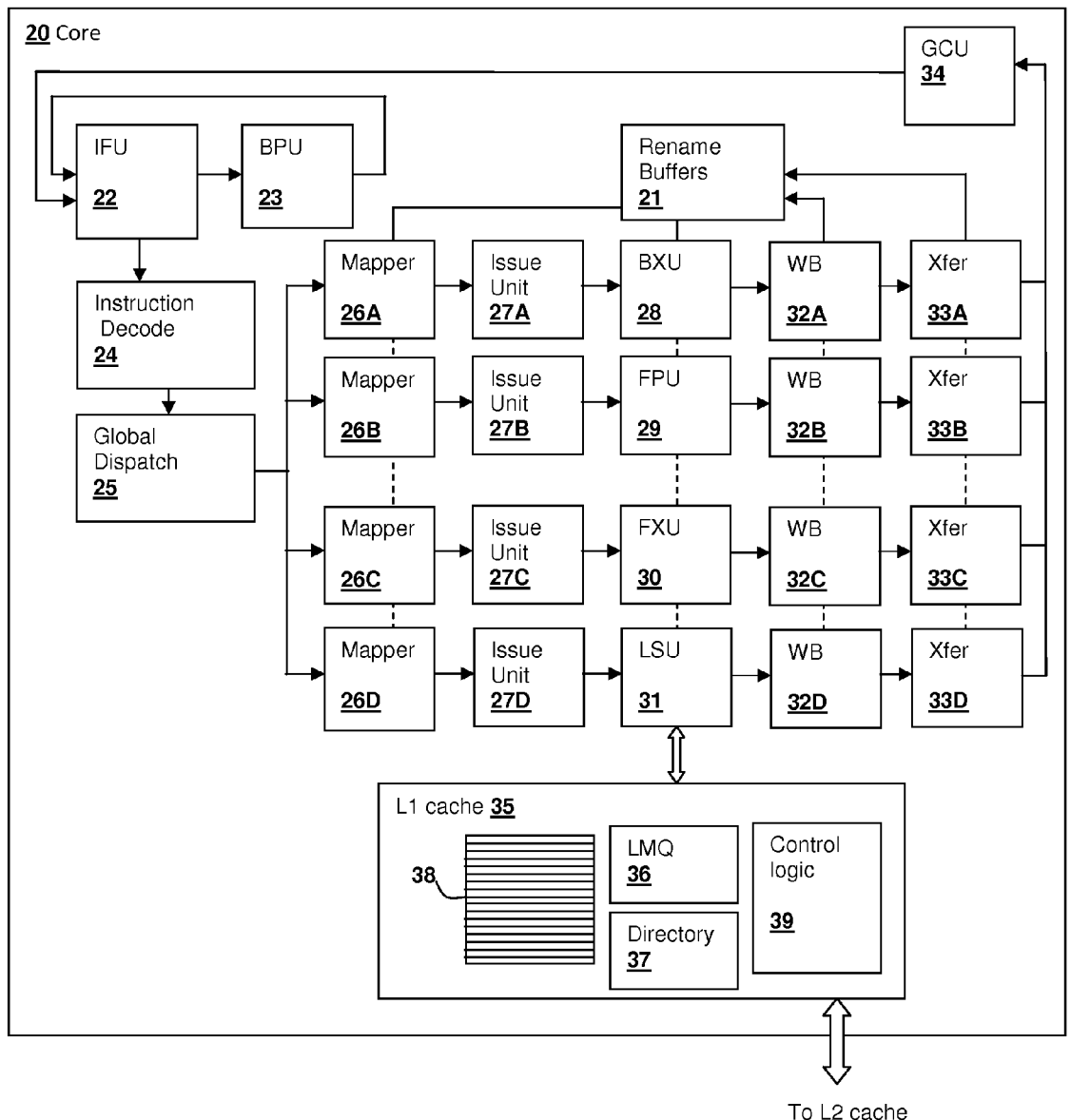
FIG. 2 is a block diagram illustrating details of a processor core in accordance with an embodiment of the present invention.

Referring now to FIG. 2, details of processor cores 20A-20B of FIG. 1 are illustrated in depicted core 20. Core 20 includes an instruction fetch unit (IFU) 22 that fetches an instruction stream from cache or system memory and presents the instruction stream to an instruction decode unit 24. A global dispatch unit 25 dispatches the decoded instructions to a number of internal processor pipelines. The processor pipelines each include a mapper 26A-26D, an issue unit 27A-27D, an execution unit, one of branch execution unit (BXU) 28, load/store unit (LSU) 31, fixed-point unit (FXU) 30 or floating point unit (FPU) 29, a write back unit (WB) 32A-32D and a transfer unit (Xfer) 33A-33D. A global completion unit (GCU) 34 provides an indication when result transfer is complete to IFU 22. Mappers 26A-26D allocate rename buffers 21 to represent registers or "virtual registers" indicated by instructions decoded by instruction decode unit 24 so that concurrent execution of program code can be supported by the various pipelines. Out-of-order execution is also supported by the use of rename buffers 21 as the register values are fully virtualized by the action of mappers 26A-26D. WBs 32A-32D write pipeline results back to associated rename buffers 21 and Xfers 33A-33D provide an indication that write-back is complete to GCU 34 so that pipeline results are synchronized with the execution and instruction fetch process.

In the illustrated core 20, load store unit LSU 31 is coupled to a L1 cache memory 35 that provides, in the exemplary embodiment, a data cache. However, the techniques of the present invention can also be applied to instruction caches for cache-directed prefetch of instructions. Further, while one LSU 31 is shown in the exemplary core 20, multiple LSUs 31 may be present, depending on the particular processor architecture. Further, the techniques of the present invention may be applied at any level of cache and multiple levels of cache, so that a cache shared between multiple cores, such as a cache within local storage 12 of FIG. 1 may include cache-triggered prefetching of data and/or instructions.

L1 cache memory 35 contains a value storage 38 for storing cache line values, a load miss queue (LMQ) 36 for tracking load misses and performing stream detection, a directory 37 for mapping locations in value storage 38 to addresses and for storing flags corresponding to each cache line, including particular flags for carrying out the present invention, and a control logic 39 that operates the cache according to the methodologies of the present invention as presented in further detail below.

Referring now to FIG. 3A, data structures within LMQ 36 are shown in the form of entries 40 corresponding to missed cache lines that contain the following fields: a line address, a first offset, a second offset, other flags, a prefetched "P" bit and a direction "D" bit. On a first miss to a cache line, an entry 40 is generated in LMQ 36. The offset of the first miss is stored in the Offset 1 field. A second load miss occurring at an address matching the line address stored in entry 40 of LMQ 36 indicates a detected stream. In response to the second load miss, the Offset 2 field is set to the offset of the second load miss and the direction is determined from the difference between Offset 2 and Offset 1. A prefetch request is issued for the adjacent cache line in the direction specified by the D bit and an LMQ 36 entry is allocated for the requested cache line, with the P bit set to "1" and D bit preset according to the stream direction. If the offset of the second miss is equal to Offset1, the second miss can be ignored, with Offset 2 remaining un-initialized and the P and D bit values unchanged. Alternatively, a predetermined direction value can be set, for example D=1, corresponding to an increasing address for the stream values.

Referring now to FIG. 3B, data structures within directory 37 are shown in the form of entries 42 corresponding to cache lines that are present in the value storage 38 of FIG. 2. Entries 42 contain the following fields: a line address, an index/tag field, other flags, a "P" bit and a "D" bit. The P bit is set when a cache line is first prefetched into L1 cache 35 and entry 42 is generated in directory 37. The P bit and D bit are copied from the corresponding bits in entry 40 of LMQ 36, which is retired when the prefetched line is loaded into value storage 38. When an access is made to a prefetched cache line present in value storage 38, i.e., a cache hit is detected and the P bit entry 42 of directory 37 is set, the P bit is cleared, a prefetch of an adjacent cache line is requested from a next lower level of the memory hierarchy and a new LMQ entry 36 is generated for the requested line. The resulting action ensures that the prefetch mechanism is always fetching at least one line ahead of the cache lines that have been already accessed in a stream.

Referring now to FIG. 3C, an alternative data structure is used within value storage 38 in the form of entries 44. In the example illustrated in FIG. 3C, the P and D bits are stored as flags in the tag area of value storage 38, rather than in the cache directory as illustrated in FIG. 3B. The operation otherwise is identical to the operation described above with respect to FIG. 3B.

Figure 4:
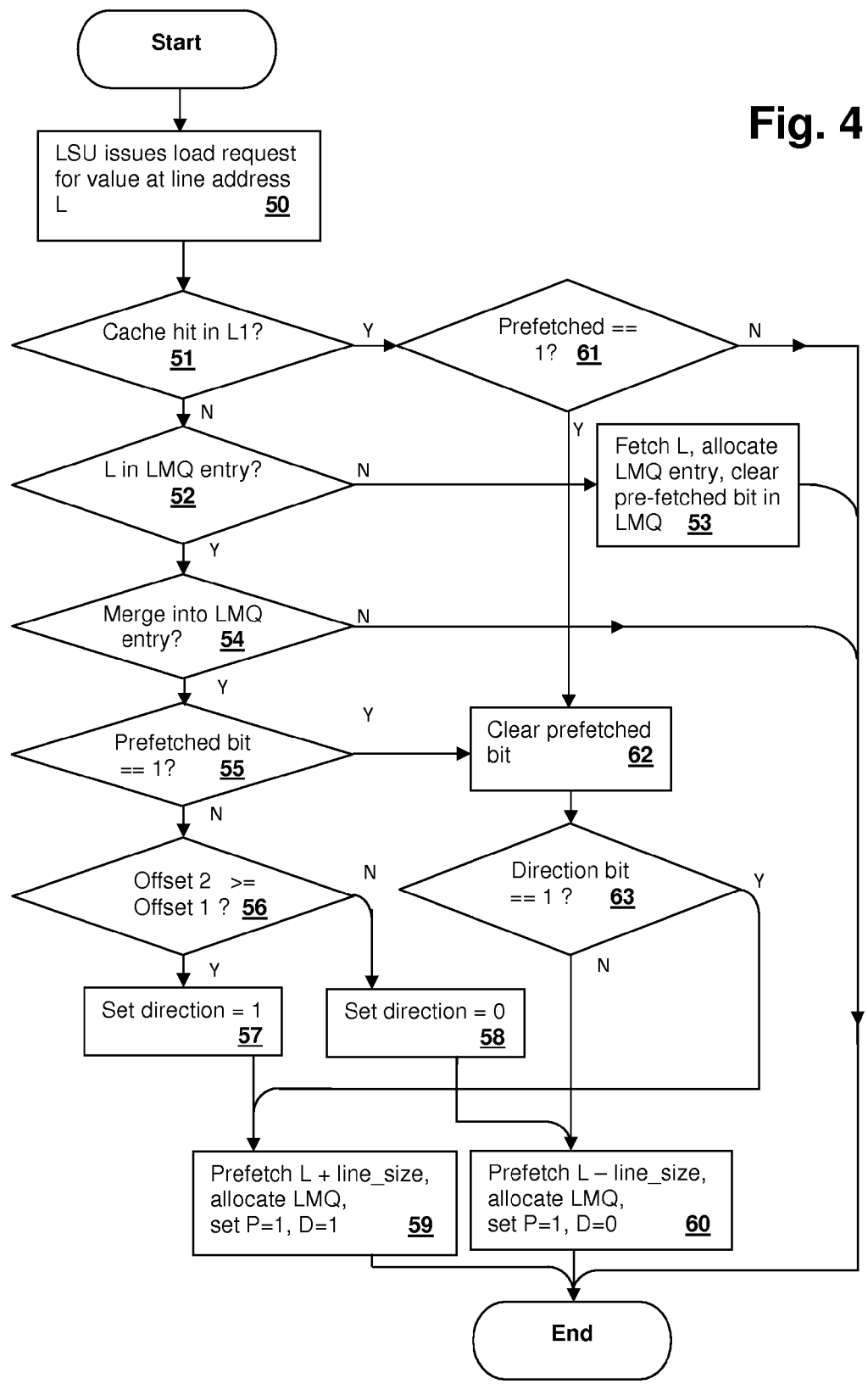
FIG. 4 is a flow chart depicting a method of cache-directed prefetch in accordance with an embodiment of the present invention.

Referring now to FIG. 4, a method according to an embodiment of the present invention is depicted a flow chart. When the LSU issues a load request for a value at line address L (step 50), if the line address L "hits" in the L1 cache (decision 51), then the P bit in the directory or cache entry is tested. If the P bit is "0" (decision 61) no action is taken, otherwise the P bit is cleared (step 62), and if the D bit is "1" (decision 63), a prefetch request is issued for the next higher address cache line, and an LMQ entry is generated with the P bit set to "1" and the D bit set to "1" (step 59). If the D bit is "0" (decision 63), a prefetch request is issued for the next lower address cache line, and an LMQ entry is generated with the P bit set to "1" and the D bit set to "0" (step 60).

If the request for line L misses (decision 51) and L is not in an LMQ entry (decision 52), line L is fetched, and an LMQ entry is allocated for line L with the P bit set to "0" (step 53). If L is in an LMQ entry (decision 52), but both offset1 and offset2 are set in the LMQ entry, i.e., the miss cannot be merged into the LMQ entry (decision 54) then no action is taken. If line L can be merged (decision 54) and the P bit is "1" (decision 55), the P bit is cleared (step 62), and if the D bit is "1" (decision 63), a prefetch request is issued for the next higher address cache line, and an LMQ entry is generated with the P bit set to "1" and the D bit set to "1" (step 59). If the D bit is "0" (decision 63), a prefetch request is issued for the next lower address cache line, and an LMQ entry is generated with the P bit set to "1" and the D bit set to "0" (step 60). If line L can be merged (decision 54) and the P bit is "0" (decision 55), then a stream is detected and if Offset2 is greater than or equal to Offset1 (decision 56) then the D bit is set to "1" (step 57), a prefetch request is issued for the next higher address cache line, and an LMQ entry is generated with the P bit set to "1" and the D bit set to "1" (step 59). Otherwise the D bit is set to "0" (step 58) and a prefetch request is issued for the next lower address cache line, and an LMQ entry is generated with the P bit set and the D bit set to "0" (step 60).

The above described embodiments are illustrative of application of the techniques of the present invention to data fetches in an L1 level cache. The techniques of the present invention as described above can be applied in lower levels of cache, in particular, the P and D bits can be propagated to lower levels of cache, with the stream detection only being required at the highest level. Further, write-back operations can be performed at the highest level of cache, with the LMQ stream prediction providing the automatic update and un-marking of modified (or unmodified cache lines, in architectures where "blind" write-backs are more efficient). Further, stream detection can be qualified on a longer span of accesses, such as accesses to two or more adjacent cache lines rather than qualifying based on two offsets in the same cache line as illustrated above. Further, additional tag bits or a field for the P bit can be used to count a number of misses (or accesses in the case of lines that hit) that can be used to control the number of lines prefetched for a stream when more prefetch bandwidth and cache storage are present or to qualify triggering the original prefetch according to a threshold when less prefetch bandwidth is available or cache resources are limited.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of prefetching sequential values from a lower level of a memory hierarchy into a cache memory at a higher level of the memory hierarchy, the method comprising:
   receiving an access request for a value at the cache memory;
   determining whether or not a cache line containing the value is present in the cache memory;
   responsive to determining the cache line is present in the cache memory, retrieving a first indicator associated with the cache line that indicates whether or not the cache line has been previously accessed since the cache line was prefetched;
   determining whether or not the cache line has been previously accessed in conformity with a value of the first indicator;
   responsive to determining that the cache line has not been previously accessed, requesting loading, from the lower level of a memory hierarchy, of another line of values into the cache memory having a sequential relationship with the cache line, whereby the cache memory triggers automatic prefetching of cache lines ahead of requests for access to their values;
   responsive to determining the cache line is not present in the cache memory, determining whether a line address of the value is present in a load miss queue entry of the cache memory;
   responsive to determining that the line address is present in the load miss queue entry, determining whether or not the cache line has had a previous load miss, wherein the requesting loading is further performed responsive to the determining that the cache line has had a previous load miss; and
   responsive to determining that the cache line has had a previous load miss, comparing a first offset of a previous load miss stored in the load miss queue entry with a second offset of the value, wherein the requesting loading requests a next higher line address cache in the sequential relationship if the first offset is less than or equal to the second offset or requests a next lower line address cache line in the sequential relationship if the first offset is greater than the second offset.

2. The method of claim 1, further comprising retrieving a second indicator associated with the cache line that specifies a direction of prefetching for a stream associated with the cache line and wherein the requesting loading requests the another cache line according to a direction of addressing specified by the second indicator.

3. The method of claim 2, wherein the first indicator is a first bit and the second indicator is a second bit that are stored in an entry in a directory of the cache corresponding to the cache line or in a tag of the cache line, and wherein the method further comprises responsive to the determining that the cache line was not previously accessed, setting the first bit to a state that indicates that the cache line has been accessed since being prefetched.

4. A method of detecting a stream of cache lines for prefetching from a lower level of a memory hierarchy into a cache memory at a higher level of the memory hierarchy, the method comprising:
   receiving an access request for a value at the cache memory;
   determining whether a line address of the value is present in a load miss queue entry of the cache memory corresponding to a cache line;

responsive to determining that the line address present in the load miss queue entry, determining whether or not the cache line has had a previous load miss;

responsive to determining that the cache line has had a previous load miss, generating an indication of a detected stream and storing the indication within the load miss queue;

responsive to determining that the cache line has had a previous load miss, determining a direction of the stream by comparing a first offset of the previous load miss stored in the load miss queue entry with a second offset of the value and storing an indication of the direction in the load miss queue entry; and responsive to determining that the cache line has had a previous load miss, requesting loading, from the lower level of the memory hierarchy, another line of values into the cache memory having a sequential relationship with the cache line.

5. The method of claim 4, further comprising inserting a new entry into the load miss queue for the another line of values and copying the indication of the direction into the new entry.

6. The method of claim 4, further comprising:
receiving the requested another line of values at the cache memory;
storing the requested another line of values into another cache line of the cache memory; and
copying the direction indication from the new entry into a storage corresponding to the another cache line, and setting an indication that the another cache line has been prefetched but not accessed.

7. A cache memory circuit, comprising:
a plurality of cache line storage locations;
control logic that receives an access request for a value, determines whether or not a cache line containing the value is present in the cache memory, responsive to determining the cache line is present in the cache memory, retrieves a first indicator from the cache memory associated with the cache line that indicates whether or not the cache line has been previously accessed since being prefetched, determines from a value of the first indicator whether or not the cache line has been previously accessed, and responsive to determining that the cache line has not been previously accessed, requests loading of another line of values into the cache memory having sequential relationship with the cache line, whereby the cache memory triggers automatic prefetching of cache lines ahead of requests for their values;
wherein responsive to determining the cache line is not present in the cache memory, the control logic determines whether a line address of the value is present in a load miss queue entry of the cache memory and responsive to determining that the line address present in the load miss queue entry, determines whether or not the cache line has had a previous load miss, and responsive to determining that the cache line has had a previous load miss, requests the loading of the another line; and
wherein the control logic further compares a first offset of the only one load miss stored in the load miss queue entry with a second offset of the value, in response to determining that the cache line has had a previous load miss, wherein the control logic requests a next higher line address cache line in the sequential relationship if the first offset is less than or equal to the second offset and requests a next lower line address cache line in the sequential relationship if the first offset is greater than the second offset.

8. The cache memory circuit of claim 7, wherein control logic further retrieves a second indicator associated with a cache line that specifies a direction of prefetching for a stream associated with the cache line and wherein the control logic requests the another cache line according to a direction of addressing specified by the second indicator.

9. The cache memory circuit of claim 8, wherein the first indicator is a first bit and the second indicator is a second bit that are stored in an entry in a directory of the cache corresponding to the cache line or in a tag of the cache line, and wherein the control logic further sets the first bit to a state that indicates that the cache line has been accessed since being prefetched if the control logic determines that the cache line was not previously accessed.

10. A cache memory circuit, comprising:
a plurality of cache line storage locations;
additional storage associated with each of the cache line storage locations containing a first bit for indicating whether or not a corresponding cache line storage location has been accessed since being prefetched;
control logic that receives an access request for a value, determines whether or not a line address of the value is present in a load miss queue entry of the cache memory corresponding to a cache line, responsive to determining the line address of the value is present in the load miss queue entry, determines whether or not the cache line has had a previous load miss, and responsive to determining that the cache line has had a previous load miss, generating an indication of a detected stream;
wherein the control logic further determines a direction of the stream by comparing a first offset of the previous load miss stored in the load miss queue with a second offset of the value in response to determining that the cache line has had a previous load miss, and stores an indication of the direction in the load miss queue entry; and
wherein the control logic further requests loading of another line of values into the cache memory having a sequential relationship with the cache line.

11. The cache memory circuit of claim 10, wherein the control logic further inserts a new entry into the load miss queue for the another line of values and copies the indication of the direction into the new entry.

12. The cache memory circuit of claim 10, wherein the control logic further receives the requested another line of values at the cache memory, stores the requested another line of values into another cache line of the cache memory, and copies the indication of the direction from the new entry into a storage corresponding to the another cache line and sets an indication in the storage that the another cache line has been prefetched but not accessed.

* * * * *